(12) United States Patent
Lien et al.

(10) Patent No.: US 7,414,460 B1
(45) Date of Patent: Aug. 19, 2008

(54) SYSTEM AND METHOD FOR INTEGRATED CIRCUIT CHARGE RECYCLING

(75) Inventors: Chuen-Der Lien, Los Altos Hills, CA (US); Chau-Chin Wu, Cupertino, CA (US); Tzong-Kwang Yeh, Palo Alto, CA (US)

(73) Assignee: Integrated Device Technology, inc., San Jose, CA (US)

( * ) Notice: Subject to any disclaimer, the term of this patent is extended or adjusted under 35 U.S.C. 154(b) by 167 days.

(21) Appl. No.: 11/395,061

(22) Filed: Mar. 31, 2006

(51) Int. Cl.
*G05F 3/02* (2006.01)

(52) U.S. Cl. .......................................... 327/544; 377/58

(58) Field of Classification Search ........................ None
See application file for complete search history.

(56) References Cited

U.S. PATENT DOCUMENTS

| | | | |
|---|---|---|---|
| 3,979,734 A | 9/1976 | Pricer et al. | |
| 4,334,292 A | 6/1982 | Kotecha | |
| 4,377,774 A | 3/1983 | Hosomizu | |
| 4,610,003 A | 9/1986 | Natori | |
| 4,816,894 A | 3/1989 | Hattori | |
| 5,180,928 A | 1/1993 | Choi | |
| 5,217,914 A | 6/1993 | Matsumoto et al. | |
| 5,293,563 A | 3/1994 | Ohta | |
| 5,301,085 A | 4/1994 | Miettinen | |
| 5,307,169 A | 4/1994 | Nagasaki et al. | |
| 5,406,572 A | 4/1995 | Chung | |
| 5,528,256 A | 6/1996 | Erhart et al. | |
| 5,532,956 A | 7/1996 | Watanabe | |
| 5,684,735 A | 11/1997 | Kim | |
| 5,694,445 A * | 12/1997 | Hirano et al. | 377/57 |
| 5,844,469 A | 12/1998 | Regazzi et al. | |
| 5,852,426 A | 12/1998 | Erhart et al. | |
| 5,978,255 A | 11/1999 | Naritake | |
| 6,121,650 A | 9/2000 | Akamatsu | |
| 6,201,522 B1 | 3/2001 | Erhart et al. | |

(Continued)

FOREIGN PATENT DOCUMENTS

WO    WO 2004/055985 A1    7/2004

OTHER PUBLICATIONS

W. Athas, L. Svensson, J. Koller, N. Tzartzanis, and E. Chou. A framework for practical low-power digital cmos systems using adiabatic-switching principles. International Workshop on Low Power Design, pp. 189-194, 1994.

(Continued)

*Primary Examiner*—Cassandra Cox
(74) *Attorney, Agent, or Firm*—Molly Sauter; Glass & Associates

(57) ABSTRACT

A charge recycling integrated circuit and a method for integrated circuit charge recycling. In one aspect, a charge storage collector is interposed between a high voltage supply or a low voltage supply and a function block of the integrated circuit. The charge collector is operable to selectively store a charge dissipated in the function block when the logic circuitry of the function block switches between a high voltage value and a low voltage value. The dissipated charge resulting from the switching in the logic circuitry of the function block is selectively stored to the charge collector and the charge collector selectively returns the charge stored on the charge collector to the high voltage supply, the low voltage supply or to another node in the integrated circuit as appropriate.

20 Claims, 6 Drawing Sheets

U.S. PATENT DOCUMENTS

| | | | |
|---|---|---|---|
| 6,226,194 B1 | 5/2001 | Bayer et al. | |
| 6,255,806 B1 | 7/2001 | Seppanen et al. | |
| 6,303,428 B1 | 10/2001 | Akamatsu | |
| 6,307,417 B1* | 10/2001 | Proebsting | 327/277 |
| 6,429,632 B1 | 8/2002 | Forbes et al. | |
| 6,433,619 B2* | 8/2002 | Akita et al. | 327/536 |
| 6,529,067 B2 | 3/2003 | Uen et al. | |
| 6,570,408 B2 | 5/2003 | Nowka | |
| 6,700,146 B2 | 3/2004 | Ito | |
| 6,831,852 B2 | 12/2004 | Ishigaki et al. | |
| 6,847,566 B1* | 1/2005 | Han et al. | 365/203 |
| 6,888,767 B1* | 5/2005 | Han | 365/203 |
| 6,898,136 B2* | 5/2005 | Park | 365/207 |
| RE38,918 E | 12/2005 | Svensson et al. | |
| 7,023,260 B2* | 4/2006 | Thorp et al. | 327/536 |
| 7,030,672 B2* | 4/2006 | Nakata et al. | 327/199 |
| 2002/0118060 A1 | 8/2002 | Uen et al. | |
| 2002/0172070 A1 | 11/2002 | Arimoto et al. | |
| 2003/0141528 A1 | 7/2003 | Ito | |
| 2004/0095799 A1 | 5/2004 | Jacob et al. | |
| 2004/0095819 A1 | 5/2004 | Joachim et al. | |
| 2004/0113193 A1 | 6/2004 | Menut et al. | |
| 2004/0120179 A1 | 6/2004 | Ishigaki et al. | |
| 2005/0018471 A1 | 1/2005 | Arimoto et al. | |
| 2005/0128656 A1 | 6/2005 | Croyle | |

OTHER PUBLICATIONS

Amirante, E.; Fischer, J.; Lang, M.; Bargagli-Stoffi, A.; Berthold, J.; Heer, C.; Schmitt-Landsiedel, D.; "An Ultra Low-Power Adiabatic Adder Embedded in a Standard 0.13 μm CMOS Environment", Solid-State Circuits Conference, 2003. ESSCIRC '03. Proceedings of the 29th European Sep. 16-18, 2003 pp. 599-602.

Conrad H. Ziesler, Joohee Kim, Marios C. Papaefthymiou and Suhwan Kim, "Energy Recovery Design for Low-Power ASICs" Proceedings of the 21$^{st}$ International Conference on Computer Design (ICCD '03).

Sanjay Dhar Dave J. Gurney, "Current and Charge Estimation in CMOS Circuits," Design Automation Conference, 1995. Proceedings of the ASP-DAC '95/CHDL '95/VLSI '95., IFIP International Conference on Hardware Description Languages; IFIP International Conference on Very Large Scale Integration., Asian and South Pacific, Aug. 29-Sep. 1, 1995 pp. 13-18.

Saravanan Rajapandian, Zheng Xu, and K. L. Shepard, "Charge-Recycling Voltage Domains for Energy-Ef.cient Low-Voltage Operation of Digital CMOS Circuits" Proceedings of the 21st International Conference on Computer Design (ICCD'03).

* cited by examiner

SYSTEM AND METHOD FOR INTEGRATED CIRCUIT CHARGE RECYCLING

BACKGROUND OF INVENTION

Low-power integrated circuits are desirable in most applications, and particularly in the field of mobile technology where power consumption is critical to the successful operation of the mobile device. Minimizing power in an integrated circuit typically starts at the gate level in any technology, but in CMOS technology in particular, some common techniques for power reduction are known in the art.

Leakage dissipation, short-circuit dissipation and dynamic dissipation in CMOS circuitry combine to form the total power dissipation of the integrated circuit. Leakage dissipation arises from substrate injection and sub-threshold effects and is primarily determined by the fabrication technology of the transistor. Dynamic or switching power consumption of a CMOS inverter arises when the capacitive load ($C_L$) is charged through the PMOS transistor to make a voltage transition from zero to the high voltage level, which is usually the supply, $V_{dd}$. As such, the energy drawn from the power supply for this positive going transition is $C_L V_{dd}^2$, half of which is stored in the output capacitor and half is dissipated in the PMOS device. Conversely, when the output switches from $V_{dd}$ to zero, no charge is drawn from the supply, but the energy stored in the output capacitor is dissipated in the pull-down NMOS transistor. In the case of an inverter, short-circuit power dissipation arises when a PMOS and an NMOS transistor are simultaneously active, conducting current directly from the supply to ground. While this is unavoidable in CMOS gates due to the inability to instantaneously switch the gates, in sufficiently quickly switched gates, the fraction of short-circuit power is small in comparison to the dynamic power in most cases.

A prototypical integrated circuit includes pull-up circuitry and pull-down circuitry, as is commonly known as an inverter circuit, a capacitive load, $C_L$, a high voltage node, $V_{dd}$, and a low voltage node, $V_{ss}$. In this configuration, the energy drawn from the power supply for a positive going transition of the output node from a zero, to a one, is $C_L V_{dd}^2$, half of which is stored in the output capacitor and half of which is dissipated in the pull-up circuitry. Conversely, when the output switches from $V_{dd}$ to zero, no charge is drawn from the supply, but the energy stored in the output capacitor is dissipated in the pull-down circuitry. During this process of switching between a zero and a one, there is a fraction of time in which both the pull-up and the pull-down circuitry are simultaneously active. This results in a short-circuit situation from $V_{dd}$ to $V_{ss}$. As such, a current flow results in a dissipation of charge in the inverter.

Since the leakage dissipation is inherent in the design of the components themselves and weakly tied to the operating voltage, integrated circuit designers have little control over the static leakage of the circuit. Accordingly, power reduction techniques are commonly focused on minimizing the short-circuit and dynamic power dissipation of the integrated circuit. Low-power integrated circuit designs are commonly focused on either designing low-power circuitry or efficient power management. Low-power designs seek to reduce the power dissipation by lowering the operating voltages or the switching frequency thereby reducing the overall dynamic power of the device. However, lower operating voltages and slower frequencies also result in slower operating speeds. Efficient power management techniques strive to reduce the dynamic power dissipation in the integrated circuit through the optimization of the physical, circuit and logic levels. Some common techniques for efficient power management include optimizing placement of devices and routes of signals, transistor sizing, reducing swing logic, logic minimization and logic level power down. The techniques known in the art for efficient power management rely on architecture or algorithm level optimization of the integrated circuit to realize a reduction in power dissipation.

Power dissipation in an integrated circuit is a measure of the efficiency of the system. The efficiency of the system affects the design of the power supply for the system. Accordingly, systems that are inefficient waste more energy and therefore require a larger power supply. In battery-operated systems, such as mobile devices, the power dissipation in the system reduces the life of the battery. The more power dissipated, the larger the battery required to operate the device. Larger batteries requirements inherently increase the cost and weight of the system, which is undesirable in mobile devices. In addition to the wasted energy generated by an inefficient system, power dissipation generates heat. An inefficient system must therefore accommodate the increased heat dissipation in the system by utilizing heat sinks to protect the circuitry. Such heat sinks also add undesirable cost, size and weight to the mobile system.

While the techniques known in the art for reducing the power dissipation of integrated circuits have achieved, noted success, there exists an ongoing need in the art for additional systems and methods for minimizing the power dissipated by a digital system.

SUMMARY OF INVENTION

The power dissipated in an integrated circuit by either short-circuit dissipation or dynamic dissipation represents energy that could be recycled for reuse in the integrated circuit. Accordingly, the present invention provides a system and method for recycling the charge dissipated in an integrated circuit during switching operations and temporary short-circuit conditions.

In a specific embodiment, the present invention provides a charge recycling circuit for use in an integrated circuit, the charge recycling circuit includes a function block having logic circuitry to be charged from a high voltage node and discharged to a low voltage node during the operation of the circuit, a charge collector selectively coupled to the function block to collect the positive charge dissipated within the function block when the function block is discharged to the low voltage node from the high voltage node and a voltage converter selectively coupled to the charge collector to convert the collected charge to a predetermined voltage level and to recycle the converted charge back to the function block or to the integrated circuit for reuse.

In an additional embodiment for recycling negative changes, the present invention provides a charge recycling circuit for use in an integrated circuit including a function block having logic circuitry to be charged from a high voltage node and discharged to a low voltage node during the operation of the circuit, a charge collector selectively coupled to the function block to collect a negative charge dissipated within the function block when the function block is charged to the high voltage node from the low voltage node and a voltage converter selectively coupled to the charge collector to convert the collected charge to a predetermined voltage level and to recycle the converted charge back to the function block or to the integrated circuit for reuse.

In a specific embodiment, a voltage clamp is positioned in parallel with the charge collector to clamp the voltage level at the function block.

In accordance with additional embodiments of the present invention, the voltage clamp is a diode, the charge collector is a charge storage capacitor and the voltage converter is a charge pump.

In an additional embodiment, the charge pump in accordance with the present invention is realized using a plurality of switches to control the voltage connections to a plurality of capacitors. Accordingly, the capacitors are used as energy storage elements to convert input voltages into other voltages.

As such, instead of allowing the charge dissipated when the output of the function block of the integrated circuit is switched from a high value to a low value to discharge to ground, the present invention captures the dissipated charge and stores it utilizing a charge collector. When the output node switches from a high value to a low value, the dissipated charge is considered positive and as such the stored charge is transferred back to the supply voltage to provide positive charge to the battery, or to another high voltage node. Conversely, when the output of the integrated circuit is switched from a low value to a high value, the present invention serves to capture the dissipated charge and stores it utilizing a charge collector. When the output node-switches from a low value to a high value, the dissipated charge is considered negative and as such the stored charge is transferred back to the supply voltage to provide negative charge to the battery, or to another low voltage node.

While numerous circuit configurations are within the scope of the present invention to provide the switching circuitry, in a particular embodiment, the switching circuit is a CMOS inverter having associated pull-up circuitry and pull-down circuitry to facilitate switching of the switchable output node.

The charge dissipated during the switching operation of the integrated circuit may be a result of the dynamic switching power dissipation in the circuitry or a result of the temporary current flow during a short-circuit condition.

Additionally, the design of the present invention allows for multiple charge collectors to be selectively coupled to the function block. As such, one charge collector could be selected to charge the storage capacitor from the output node and another charge collector could be simultaneously transferring the stored charge back to the voltage supply for reuse in the circuit.

To insure that the stored charge will serve to benefit the supply voltage upon transfer of the charge, a threshold voltage detector may be included to measure the charge at the charge to voltage converter and to allow transfer of the voltage only when the charge has reached a predetermined threshold voltage level.

As described, the present invention provides a method for recycling charges that are dissipated by switching operations in an integrated circuit. In the prior art, these dissipated charges would be wasted by allowing them to discharge through the load to ground. By contrast, the present invention serves to recycle these charges for subsequent use in the integrated circuit.

Accordingly, the method in accordance with the present invention includes selecting a function block of the integrated circuit, storing a charge dissipated during the charging and discharging of the logic circuitry within the function block to a charge collector, and transferring the stored charge from the charge collector back to the integrated circuit. The dissipated charge may be considered to be a positive charge caused by a switching operation in the function block from a high voltage value to a low voltage value, or a negative charge caused by a switching operation in the function block from a low voltage value to a high voltage value.

After the charge has been stored to the charge collector, the charge is then recycled for use in the circuit. In the case of a positive charge, the charge is transferred to $V_{dd}$ or another high voltage node. In the case of a negative charge, the charge is transferred to $V_{ss}$ or another low voltage node.

The present invention is advantageous because, by capturing the dissipated charge inherent in an integrated circuit and recycling the charge for productive use, the overall power consumption of the integrated circuit is reduced. Other objects and advantages of the invention will become apparent upon reading the following detailed description and upon reference to the accompanying drawings.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
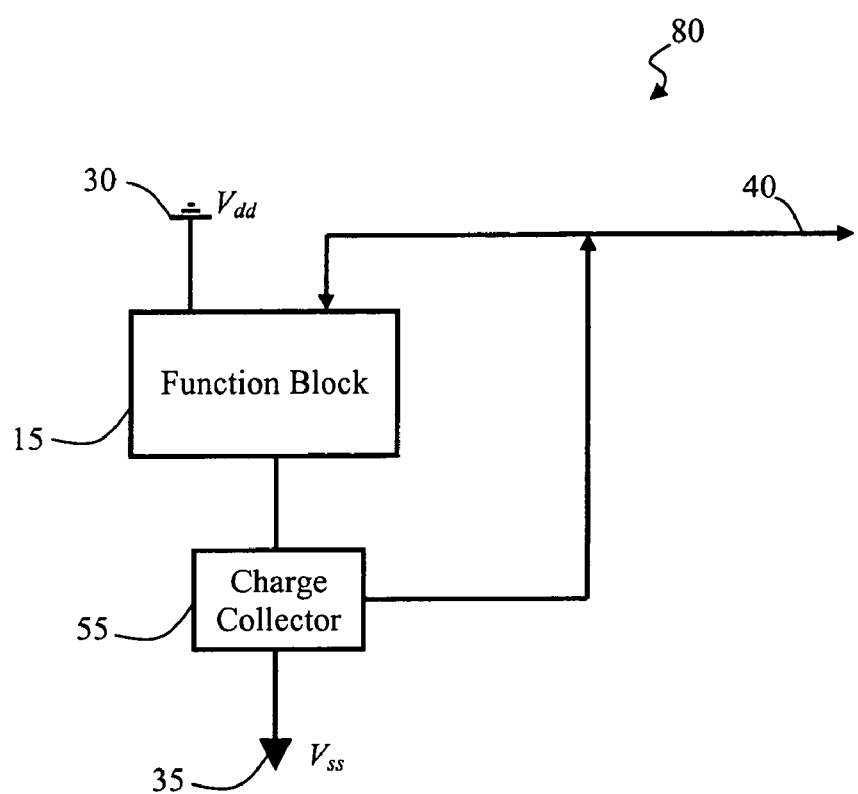
FIG. 1 illustrates a charge recycling circuit in accordance with the present invention.

Referring now to FIG. 1, a charge recycling integrated circuit 80 in accordance with the present invention is illustrated. As shown, in a specific embodiment of the present invention, integrated circuit 80 includes a function block 15. The term "function block," as used in the present application, refers to any circuit or group of circuits that perform one or more function. In the present embodiment function block 15 is representative of a section of logic circuitry in an integrated circuit. A charge collector 55 is coupled to the function block 15 such that the charge that would be typically dissipated in the logic circuitry of the function block 15 of the circuit when the logic circuitry switches from a high voltage node 30 to a low voltage node 35, or from a low voltage node 35 to a high voltage node 30, will instead be collected by the charge collector 55 and reused in the circuit.

The function block 15 in accordance with the present invention represents a section of logic circuitry in an integrated circuit such that the function block 15 dissipates a positive charge when the logic circuitry of the function block 15 is pulled down from a high voltage level to a low voltage level and the function block 15 dissipates a negative charge when the logic circuitry of the function block 15 is pulled up from a low voltage level to a high voltage level. In an exemplary embodiment, the logic circuitry within the function block may include a CMOS inverter having an output that is switched between a high voltage value and a low voltage value dependent upon the input to the inverter.

Figure 2:
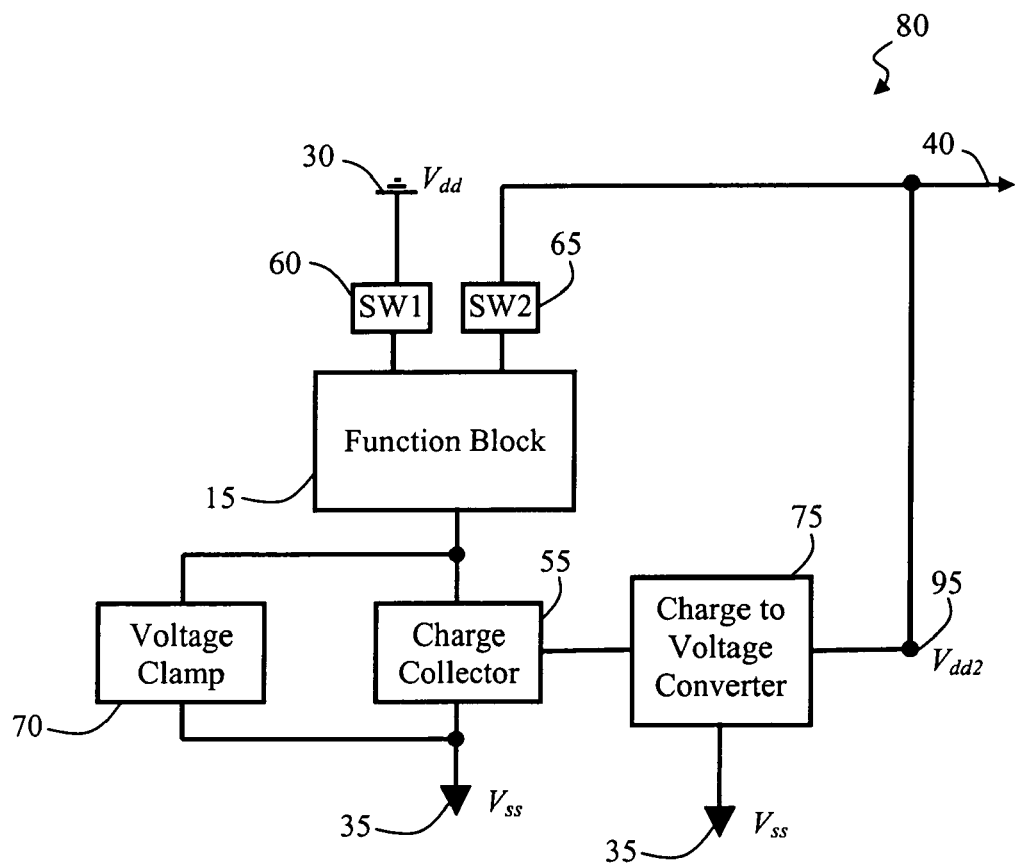
FIG. 2 illustrates a positive charge recycling circuit in accordance with an embodiment of the present invention wherein a positive dissipated charge is recycled for subsequent use in the integrated circuit.

An embodiment of the present invention for use in recycling a collected positive charge is shown with reference to FIG. 2. In this embodiment, the function block 15 includes switching logic circuitry such that when $S_{W1}$ 60 is closed, the logic of the function block 15 is switched from a high voltage $V_{dd}$ 30 to a low voltage value $V_{ss}$, 35, and as such, the positive charge that would normally be dissipated when the logic in the function block is switched from a high voltage $V_{dd}$ 30 to a low voltage $V_{ss}$ 35, is instead collected by the charge collector 55. In accordance with this embodiment, a voltage clamp 70 is used to limit the voltage level to an acceptable operational voltage level for the function block 15. After the charge is collected at the charge collector 55, $S_{W1}$ 60 is opened and $S_{W2}$ 65 is closed to allow the recycling of the collected charge back to the function block 15 or to another node in the integrated circuit 40. In this particular embodiment, a charge to voltage converter 75 is used to convert the positive charge stored at the charge collector 55 into a desired voltage value, such as $V_{dd2}$ 95 for reuse in the circuit.

Figure 3:
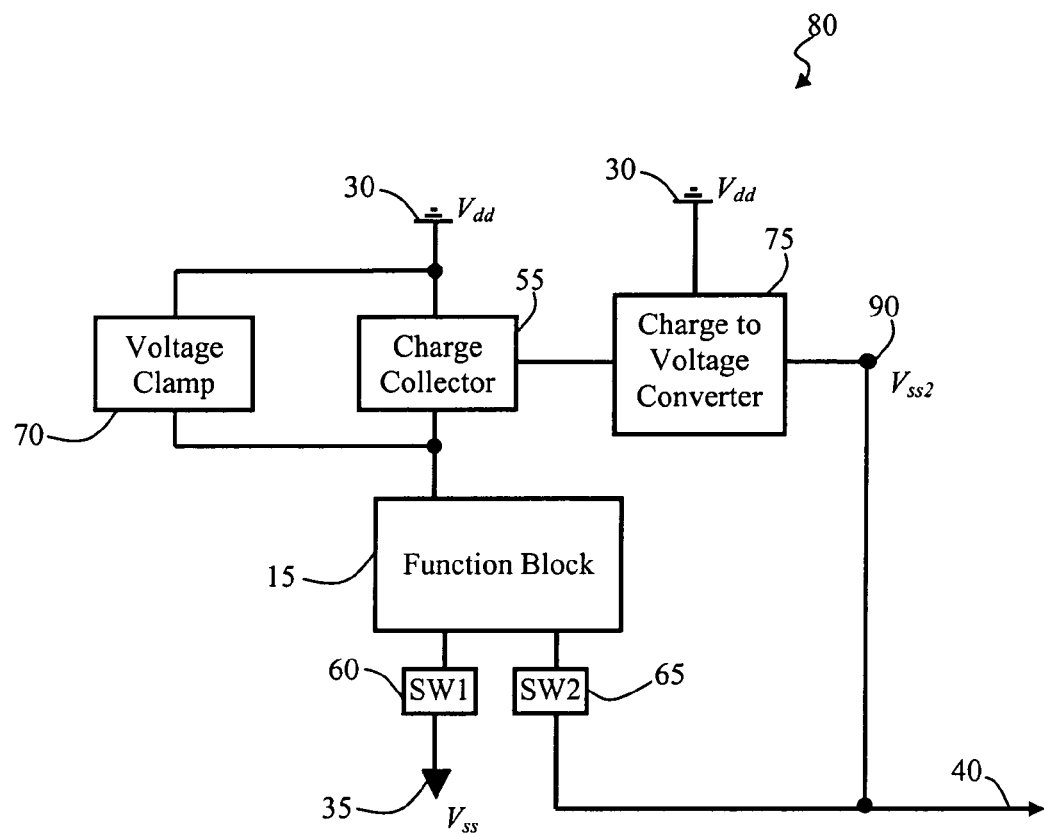
FIG. 3 illustrates a negative charge recycling circuit in accordance with an embodiment of the present invention wherein a negative dissipated charge is recycled for subsequent use in the integrated circuit.

An additional embodiment of the present invention for use in recycling a collected negative charge is shown with reference to FIG. 3. In this embodiment, the function block 15 includes switching logic circuitry such that when $S_{W1}$ 60 is closed, the logic of the function block 15 is switched from a low voltage value $V_{ss}$, 35 to a high voltage $V_{dd}$ 30, and as such, the negative charge that would normally be dissipated when the logic in the function block is switched from a low voltage $V_{ss}$ 35 to a high voltage $V_{dd}$ 30, is instead collected by the charge collector 55. In accordance with this embodiment, a voltage clamp 70 is used to limit the voltage level to an acceptable operational voltage level for the function block 15. After the charge is collected at the charge collector 55, $S_{W1}$ 60 is opened and $S_{W2}$ 65 is the closed to allow the recycling of the collected charge back to the function block 15 or to another node of the integrated circuit 40. In this particular embodiment, a charge to voltage converter 75 is used to convert the negative charge stored at the charge collector 55 into a desired voltage value, such as $V_{ss2}$ 90 for reuse in the circuit.

Figure 4:
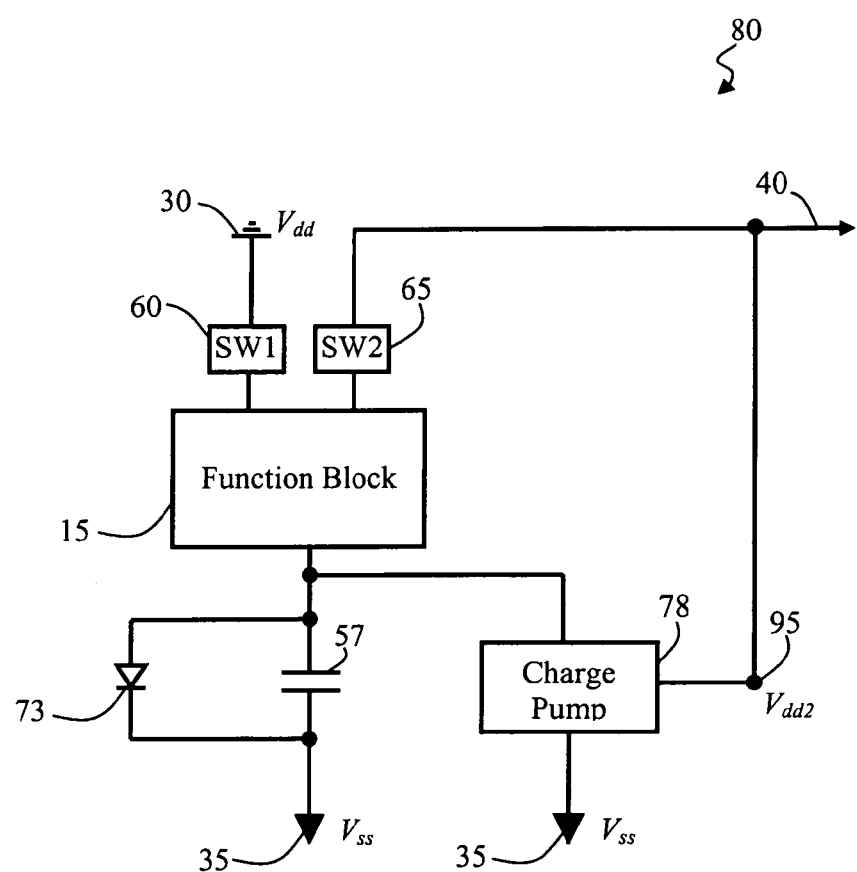
FIG. 4 illustrates a positive charge recycling circuit in accordance with an additional embodiment of the present invention wherein a positive dissipated charge is recycled for subsequent use in the integrated circuit.

Referring to FIG. 4, it is shown that in a particular embodiment the charge collector is a charge storage capacitor 57 effective in collecting the dissipated positive charge from the function block 15 and the voltage clamp is a diode 73 placed in parallel with the capacitor 57. Additionally, the voltage converter in accordance with this embodiment is a positive charge pump 78. Charge pumps are known in the art as electronic circuits that utilize capacitors as energy storage elements to convert DC voltages into other DC voltages.

Figure 5:
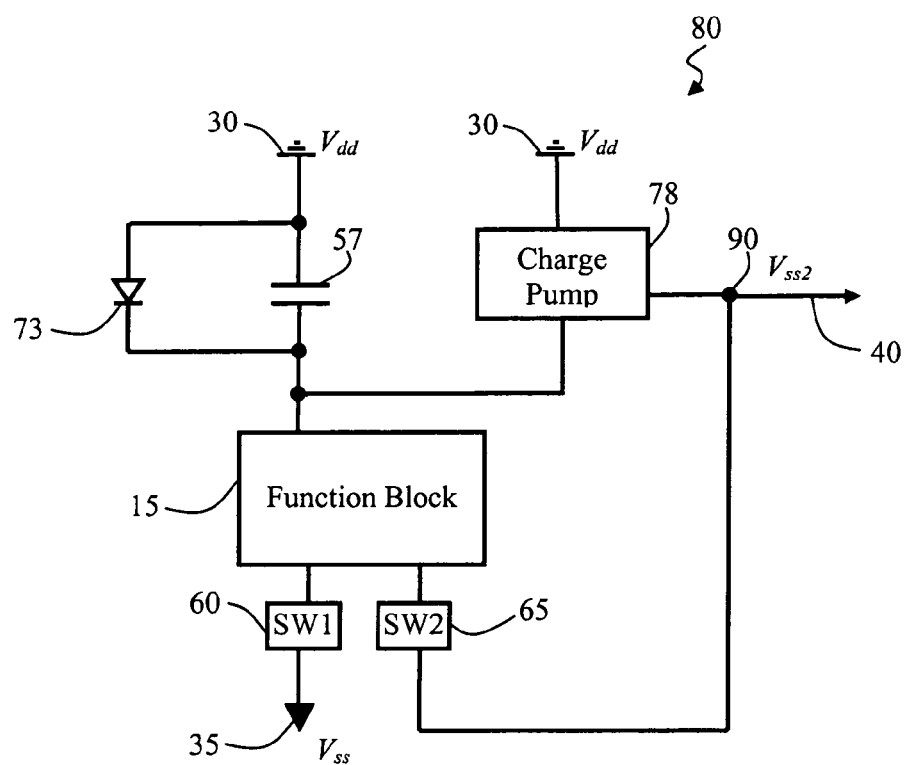
FIG. 5 illustrates a negative charge recycling circuit in accordance with an additional embodiment of the present invention wherein a negative dissipated charge is recycled for subsequent use in the integrated circuit.

Referring to FIG. 5, it is shown that in a particular embodiment, the charge collector is a charge storage capacitor 57 effective in collecting the dissipated negative charge from the function block 15 and the voltage clamp is a diode 73 placed in parallel with the capacitor 57. Additionally, the voltage converter in accordance with this embodiment is a negative charge pump 78. Charge pumps are known in the art as electronic circuits that utilize capacitors as energy storage elements to convert DC voltages into other DC voltages.

Figure 6:
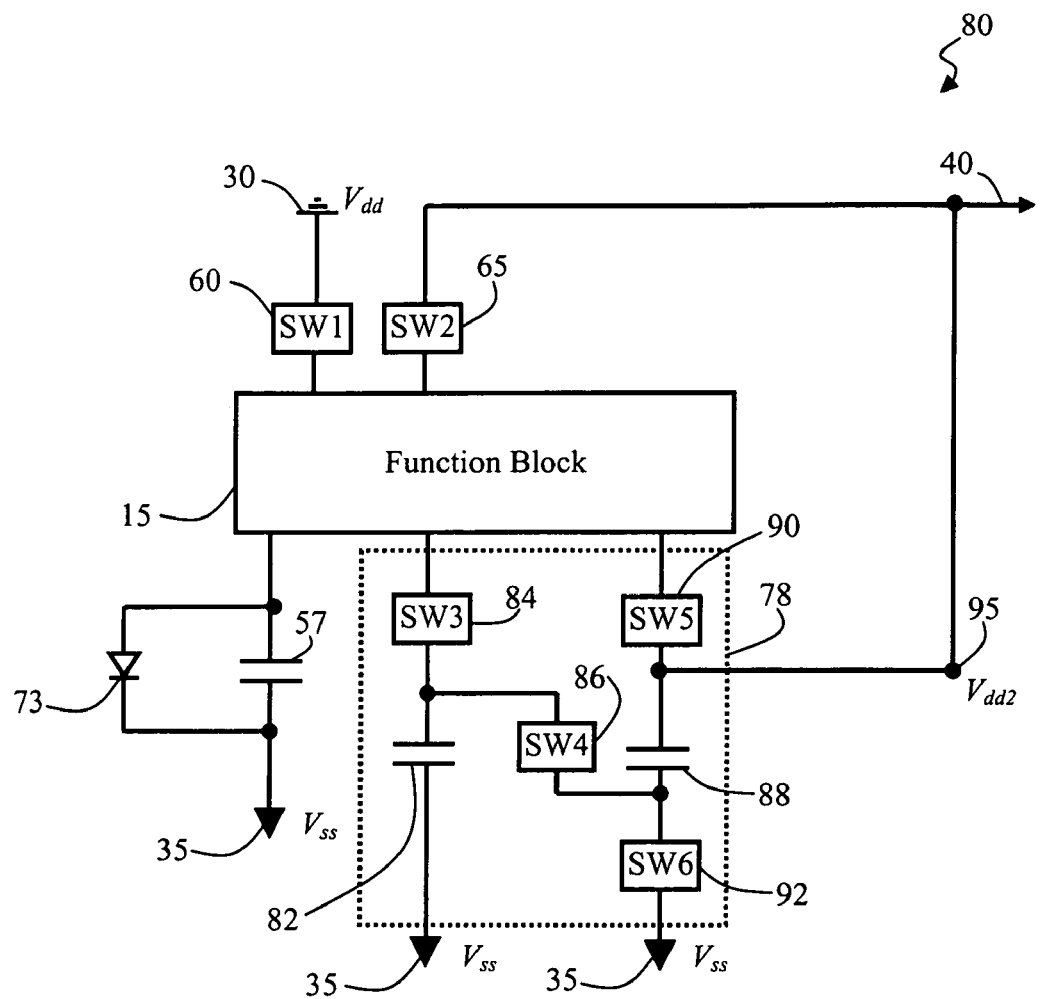
FIG. 6 illustrates a charge recycling circuit in accordance with an embodiment of the present invention wherein the charge to voltage converter is a charge pump.

An additional embodiment of the present invention is shown with reference to FIG. 6. In this embodiment, a plurality of capacitors 82, 88 and switches $S_{W3}$ 84, $S_{W4}$ 86, $S_{W5}$ 90, and $S_{W6}$ 92 are used to provide the positive charge pump 78 for the charge recycling circuit.

The use of the charge recycling circuit in accordance with the present invention results in a delay in the integrated circuit due to the time required to charge and discharge the charge storage capacitor 57. To minimize the effect of this delay and resolve timing issues in the integrated circuit, the charge recycling integrated circuit 80 may include two charge collectors 55. In this configuration, the two charge storage circuits work in tandem, such that one of the charge collectors is operable to store the charge to the charge storage capacitor and the other is operable to transfer the stored charge back to the integrated circuit.

While the storage capacitor 57 of the charge collector 55 may be any value, it is appreciated that the storage capacitor is a capacitor that has a sizeable capacitance per unit are and is large relative to the capacitive load of the function block. In one embodiment the storage capacitor 57 is a gate oxide capacitor or a metal-insulator-metal capacitor. However, other types of capacitors could also be used.

The present invention is particularly well suited for applications in which battery power conservation is a priority over speed, as is the case in mobile phones. In these applications, the focus is on maintaining a given level of computation and there is no advantage in performing the computation faster than some given rate, since the processor will simply have to wait until further processing is required. In these applications, though the speed of operation of the circuit may be reduced, the method and apparatus of the present invention provides a reduction in the power required by the device, resulting in longer battery life.

The preferred embodiment of the present invention is thus described. While the present invention has been described in particular embodiments, it should be appreciated that the present invention should not be construed as limited by such embodiments, but rather construed according to the following claims.

What is claimed is:

1. A charge recycling circuit for use in an integrated circuit, said integrated circuit comprising a function block having logic circuitry to be charged from a high voltage node and discharged to a low voltage node during the operation of the integrated circuit, the charge recycling circuit comprising:
   a charge collector selectively coupled to the function block to collect a positive charge dissipated within the function block when the function block is discharged to the low voltage node from the high voltage node; and
   a voltage converter selectively coupled to the charge collector to convert the collected charge to a predetermined voltage level and to recycle the converted charge back to the function block or to the integrated circuit for reuse.

2. The charge recycling circuit of claim 1, further comprising a voltage clamp in parallel with the charge collector to clamp the voltage level at the function block.

3. The charge recycling circuit of claim 2, wherein the voltage clamp is a diode.

4. The charge recycling circuit of claim 1, wherein the charge collector is a charge storage capacitor.

5. The charge recycling circuit of claim 1, wherein the voltage converter is a positive charge pump.

6. The charge recycling circuit of claim 1, wherein the high voltage node is the positive supply voltage for the integrated circuit.

7. The charge recycling circuit of claim 1, wherein the low voltage node is the negative supply voltage for the integrated circuit.

8. A charge recycling circuit for use in an integrated circuit, said integrated circuit comprising a function block having logic circuitry to be charged to a high voltage node from a low voltage node during the operation of the integrated circuit, the charge recycling circuit comprising:
  a charge collector selectively coupled to the function block to collect a negative charge dissipated within the function block when the function block is charged to the high voltage node from the low voltage node; and
  a voltage converter selectively coupled to the charge collector to convert the collected charge to a predetermined voltage level and to recycle the converted charge back to the function block or to the integrated circuit for reuse.

9. The charge recycling circuit of claim 8, further comprising a voltage clamp in parallel with the charge collector to clamp the voltage level at the function block.

10. The charge recycling circuit of claim 9, wherein the voltage clamp is a diode.

11. The charge recycling circuit of claim 8, wherein the charge collector is a charge storage capacitor.

12. The charge recycling circuit of claim 8, wherein the voltage converter is a positive charge pump.

13. The charge recycling circuit of claim 8, wherein the high voltage node is the positive supply voltage for the integrated circuit.

14. The charge recycling circuit of claim 8, wherein the low voltage node is the negative supply voltage for the integrated circuit.

15. A method for recycling charges dissipated by switching operations occurring in an integrated circuit, said integrated circuit comprising a function block having logic circuitry to be charged from a high voltage node and discharged to a low voltage node during the operation of the integrated circuit, the method comprising the steps of:
  collecting a charge dissipated during the charging and discharging of the function block to a charge collector;
  converting the collected charge to a predetermined voltage level; and
  recycling the converted collected charge from the charge collector back to the integrated circuit.

16. The method of claim 15, wherein the step of collecting a charge dissipated during the charging and discharging of the function block further comprises storing a positive charge to the charge collector when the logic circuitry of the function block is discharged from the high voltage node to the low voltage node.

17. The method of claim 16, wherein the stored positive charge is recycled to a high voltage node of the integrated circuit.

18. The method of claim 15, wherein the step of collecting a charge dissipated during the charging and discharging of the function block further comprises storing a negative charge to the charge collector when the logic circuitry of the function block is charged from the low voltage node to the high voltage node.

19. The method of claim 18, wherein the stored negative charge is recycled to a low voltage node of the integrated circuit.

20. The method of claim 15, further comprising the step of clamping the voltage level at the function block.

* * * * *